Aug. 1, 1950 G. WALD 2,517,265

MULTICHANNEL TELEVISION SYSTEM

Filed July 18, 1947 6 Sheets-Sheet 1

INVENTOR.

BY George Wald

INVENTOR.
BY George Wald

INVENTOR
George Wald

Aug. 1, 1950 G. WALD 2,517,265

MULTICHANNEL TELEVISION SYSTEM

Filed July 18, 1947 6 Sheets-Sheet 4

INVENTOR.

George Wald

INVENTOR
George Wald

Aug. 1, 1950 G. WALD 2,517,265

MULTICHANNEL TELEVISION SYSTEM

Filed July 18, 1947 6 Sheets-Sheet 6

INVENTOR.
George Wald

Patented Aug. 1, 1950 2,517,265

UNITED STATES PATENT OFFICE 2,517,265

MULTICHANNEL TELEVISION SYSTEM

George Wald, St. Petersburg, Fla.

Application July 18, 1947, Serial No. 761,881

23 Claims. (Cl. 178—6.8)

The present invention relates generally to long distance television apparatus, and more particularly to means comprising a long distance television chain broadcasting system.

An object of this invention is to provide means whereby high-definition television may be transmitted and received all over the United States and Canada, and make long distance television immediately available to the entire world.

At present, the television camera scans images at a rate of sixty inter-laced image-frames per second, comprising a total of about nine millions picture dots per second. At this rate of scanning, a television band of about four and one-half megacycles of successive electrical picture impulses are produced per second. This single series of electrical picture impulses modulates a single radio frequency carrier, with one side-band cutoff, and produces a total carrier side-band width of nearly six megacycles (including the vestigial side-band). Since the television modulated radio carrier must have a frequency of about ten times the television side-band width, a radio frequency carrier of sixty, or more, megacycles is required to carry this television band. At this radio frequency the reception is limited to the effective horizon only.

An object of this invention is to retain all of the picture intelligence by scanning the image as at present thereby producing a single chain of sixty image-frames per second, dividing this chain of image-frames and reverting them into a plurality of chains of continuous image-frames, transmitting and receiving each continuous chain of image frames over a separate and adjacent radio carrier. I employ, say, six double-mosaic storage tubes. Each image-frame is stored successively and intermittently at its normal periodicity (one-sixtieth of a second) upon the input mosaic of each successive storage-tube. When the sixth image-frame is stored upon the input mosaic of the sixth successive storage-tube, the operation is repeated so that each image-frame, as produced by the television camera, is stored successively and intermittently at its normal periodicity upon the input mosaic of a corresponding storage-tube. Each image-frame is retrieved from the output mosaic of each storage-tube at a periodicity equal to the product of the original periodicity and the number of storage-tubes used, which in this case is one-sixtieth of a second times six storage-tubes, or, one-tenth of a second. Thereby I produce, say, six continuous chains of ten image-frames each. Each of the continuous chains of image-frames is transmitted and received on a separate and adjacent radio carrier.

While the whole picture intelligence is carried, in total, by the six carriers, only one-sixth of it is carried by each separate carrier. Therefore, each separate carrier produces only one-sixth of the original side-band width, or one megacycle (including the vestigial side-band and separator). Each television modulated radio carrier may thus have a radio frequency of only ten megacycles and is therefore receivable at long distances.

At the receiver, the electrical picture impulses of each of the six chains of continuous image-frames are received simultaneously by six separate television radio receivers. Here too, I employ, say, six double-mosaic storage-tubes. Each chain of continuous image-frames is stored simultaneously at its periodicity (one-tenth of a second). Each image-frame is retrieved from each output mosaic of each storage-tube at its original television camera periodicity (one-sixtieth of a second). Thereby all the continuous chains of image-frames are converted into chains of intermittent image-frames. I recombine all the intermittent image-frames into one single chain of image-frames, corresponding to the original chain produced at the television camera, and reproduce like images therefrom.

There are a number of methods, well known in the art, whereby intermittent storing of image-frames is accomplished. In some of these methods, mechanical devices are employed, such as commutators and switches, whereby a chain of image-frames is divided and intermittently stored. Another method is by gating wherein an additional gating grid is used in the intermittent side of the storage-tube. This gating grid is held at a negative potential beyond the cathode-ray beam cut-off and blanks it. At periodic intervals, a positive signal is applied to this gating grid and the cathode-ray beam is restored to its normal operation. In still another method, the deflecting plates in the intermittent side of the storage-tube are maintained at a potential so as to hold the cathode-ray beam at one point of the mosaic. At a periodic interval, an opposite potential saw-tooth signal is applied across the deflecting plates and the cathode-ray beam scans intermittently the mosaic of the storage-tube, thus producing intermittent storage of an image-frame. Still another novel method, hereinafter described, is to utilize poly-phase current impulses of a fixed time periodicity, to correspond, in their total phases, to the original television camera periodicity, and store intermittent image-frames by the impulses of each phase. In fact any known method may be employed in combination with the polyphase current pulses to achieve the desired results. In the following specifications and drawings, the method of holding the cathode-ray beam to one side of the mosaic is shown since this method so clearly illustrates in the drawings the various phases of each cathode-ray beam under the influence of the polyphase impulses.

An object of this invention is to retrieve simultaneously all of the image-frames so intermittently stored and transform them into a plurality of simultaneous and continuous chains of image-frames, and to transmit and receive simultaneously each chain of image-frames over a separate and adjacent radio carrier. I rectify one side of the polyphase currents and produce polyphase pulses. Each pulse of each separate phase is applied as a trigger pulse to each of the RC grid terminals of two well known saw-tooth generator circuits. The RC in the output circuit of one generator is fixed to produce a one-sixtieth of a second intermittent scanning impulse, while the output RC of the second generator is fixed to produce continuous one-tenth of a second polyphase scanning impulses. At the transmitter the successive chain of image-frames is applied to the input side of all storage-tubes in parallel. The intermittent scanning impulses of each phase are applied in a polyphase fashion across the deflecting plates of the input side of each corresponding storage-tube. Thus each image-frame produced at the television camera is stored intermittently and successively upon the input mosaic of a corresponding storage-tube. The continuous polyphase scanning impulses are applied in a polyphase fashion across the deflecting plates of the output side of each corresponding storage-tube. A plurality of polyphase and continuous chains of image-frames are retrieved simultaneously from the output side of the storage-tubes. Each continuous polyphase chain of image-frames are transmited and received simultaneously on a separate radio carrier.

At the receiver, I use similar polyphase currents converted into continuous and intermittent polyphase impulses. I apply the continuous polyphase impulses across the deflecting plates of the input side of each corresponding storage-tube, and the polyphase intermittent impulses of each phase are applied to the output side thereof. Each continuous chain of image-frames is applied to the input side of a corresponding storage-tube. Thus I store continuously and simultaneously all the continuous polyphase chains of image-frames, as received by the receivers. The intermittent image-frames are also retrieved in a polyphase fashion from the output sides of the plurality of storage-tubes, hence, in time relation, the image-frames dovetail into one another. I recombine the intermittent image-frames to re-form the original chain of successive image-frames, corresponding to that produced at the television camera and reproduce like images therefrom.

Another object of this invention is to simultaneously scan images at the television camera in interlaced fashion, and to modulate simultaneously each side-band of each radio carrier by the electrical picture impulses produced by each interlaced image-frame. In this method of interlaced scanning both side-bands of each carrier are utilized to the fullest extent, and the vestigial side-band width is completely eliminated. Each of the two interlaced chains of image-frames are again subdivided, by image-frame, into, say, three continuous chains of image-frames, and each continuous chain of interlaced image-frames is transmitted and received over each of the two side-bands of the same radio carrier. Thus, only three radio carriers are required to carry the six chains of continuous polyphase image-frames.

Another object of this invention is to utilize my long distance television transmission in a television chain system similar to the audio chain system now being used in the United States and Canada. In my television chain system a number of local stations are established all over the country. The picture signals of each continuous chain of image-frames are received by a radio receiver. A wire chain system is used to transmit and receive the synchronizing signals in addition to the audio signals. At each local station on the chain system the continuous and intermittent synchronizing impulses are reproduced, and these impulses may be synchronized by the synchronizing signals received by the wire chain system. Each local station receives the plurality of continuous chains of image frames. It converts them into chains of intermittent image-frames and recombines the intermittent image-frames into one successive chain of image-frames. Each local station rebroadcasts the successive chain of electrical picture impulses on a predesignated radio frequency television channel. The apparatus employed at each local station receiver closely resembles the apparatus employed at the television transmitter, hence, each local station may readily be transformed into a transmitter for broadcasting video and audio signals to the entire television chain system.

Another object of this invention is to provide a simple means to synchronize the camera, the television transmitter, the local stations and automatically the home television receiver, by thirty impulses per second synchronizing signals.

Other objects and advantages will be apparent from the following description, taken in conjunction with the accompanying drawings, in which.

Figures 4, 5, 9, 10:
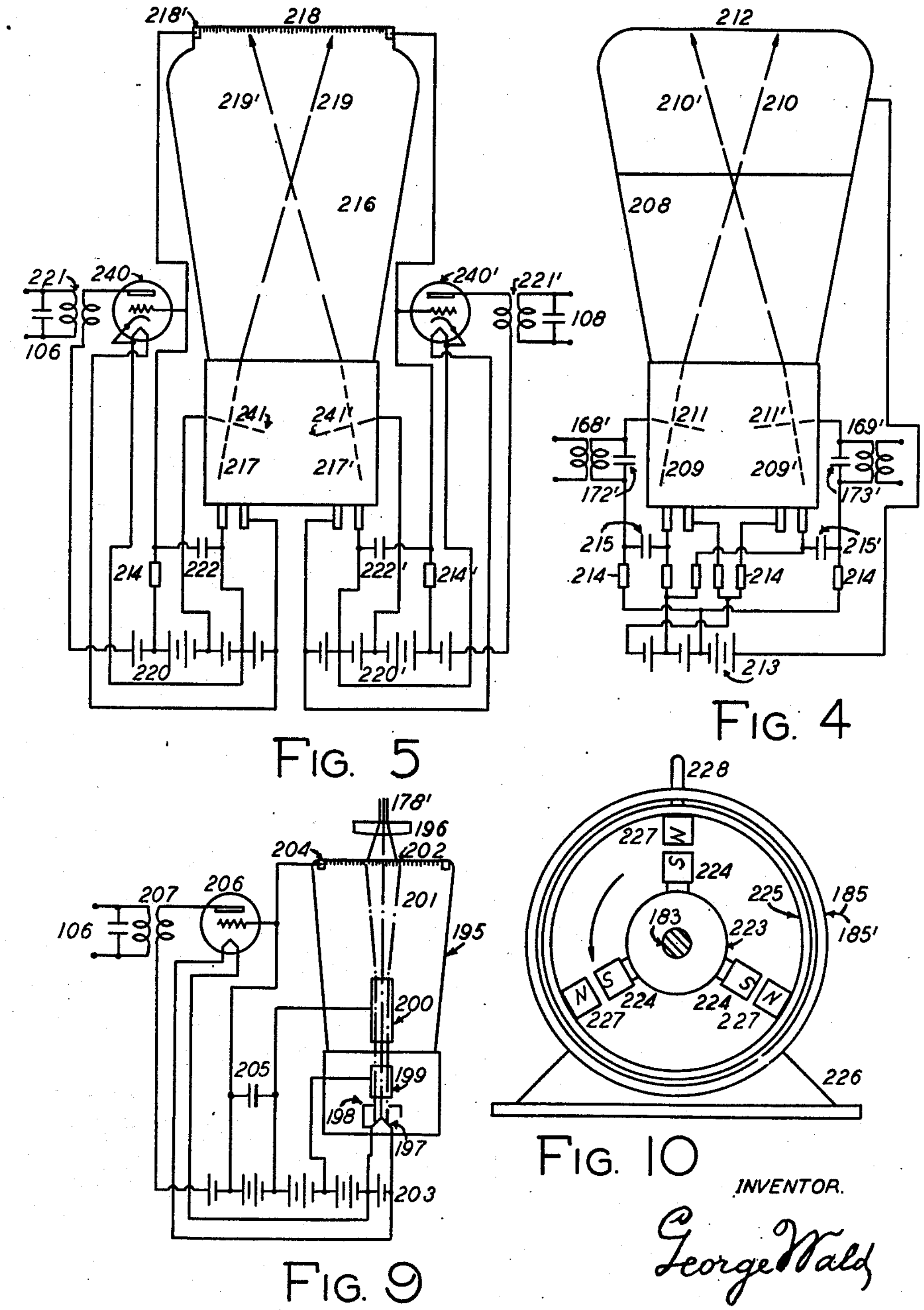

Fig. 4 is a diagrammatic view of the cathode-ray television receiver. Fig. 4 is a continuation of Fig. 2, for lack of space it is shown separately. It illustrates the type of a cathode-ray tube used and the circuits for same.

Fig. 5 is a diagrammatic view of the cathode-ray television camera tube. Fig. 5 is a continuation of Fig. 1, for lack of space it is shown separately. It illustrates the type of a cathode-ray tube used and the circuits employed therewith.

Figure 6:
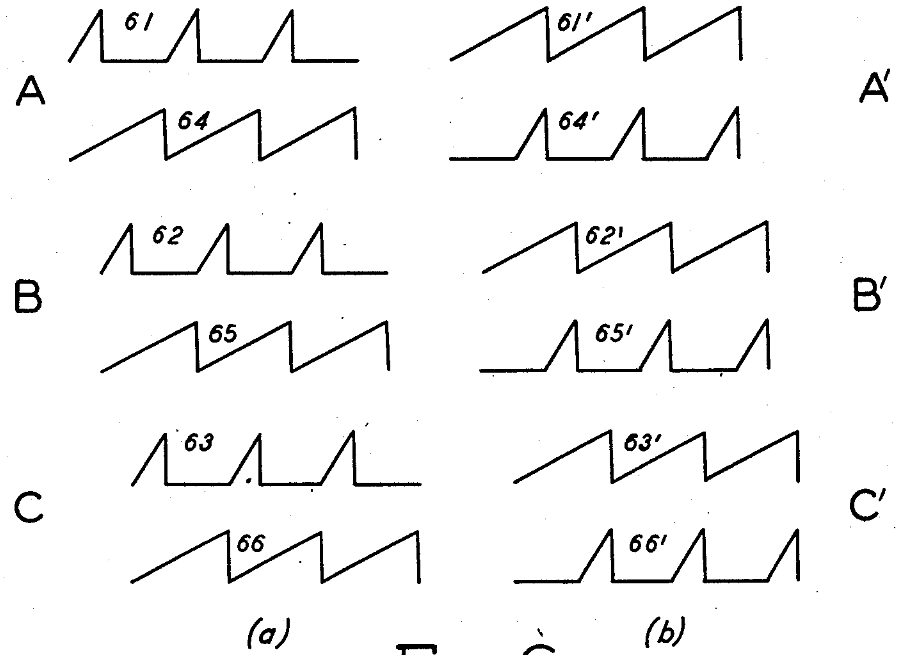

Fig. 6 shows graphic curves representing the momentary amplitudes of the various scanning impulses as applied to the deflecting plates of the storage-tubes, (*a*) illustrates their time relations as used at the television transmitter and (*b*) illustrates their time relations as used at the local stations.

Figures 3, 7:
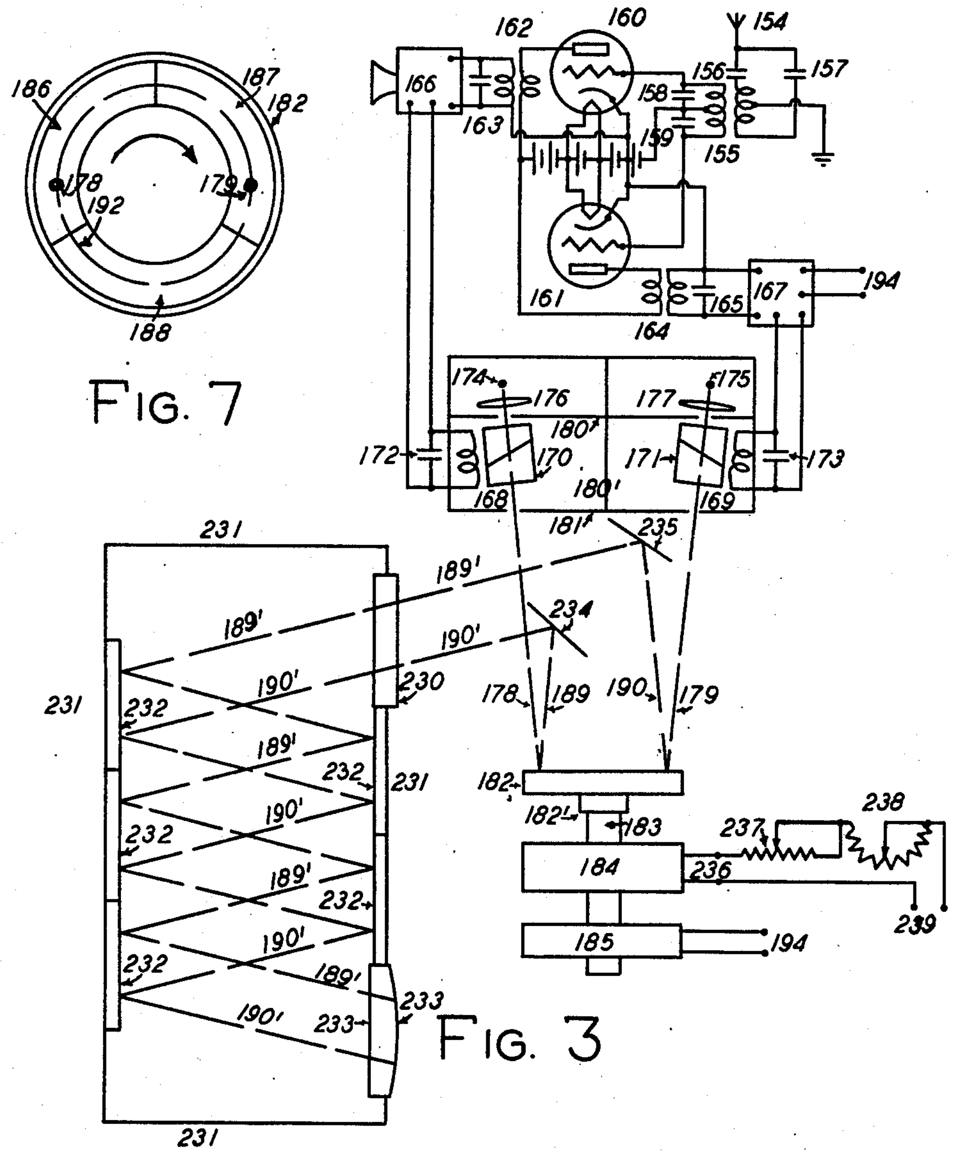
Fig. 3 is a diagrammatic view of the devices and circuits employed at the optical scanning television home receiver. Similar scanning devices with changed circuits are also employed at the optical scanning television camera.

Fig. 7 is a top view of the prime-mover disc facing the light beams.

Figure 8:
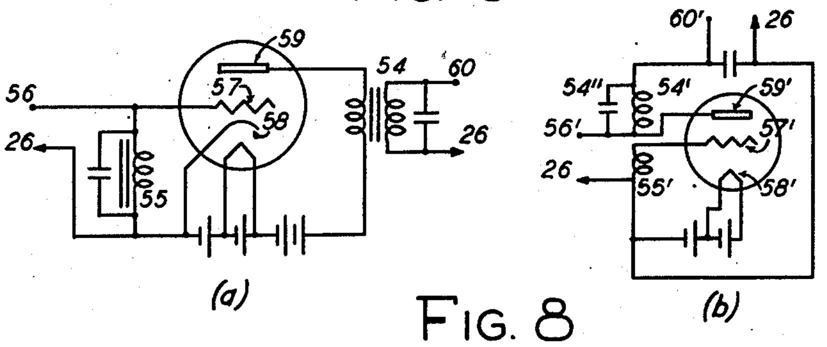

Figs. 8 (*a*) and (*b*) are diagrammatic views of a circuit employed to change the frequency of the scanning impulses.

Fig. 9 is a diagrammatic view of the circuits employed in the optical scanning camera. Fig. 9 is an alternate continuation of Fig. 1, for lack of space it is shown separately. It illustrates a small cathode-ray tube, without deflecting plates, and used to produce electrical impulses corresponding to elemental areas of an image.

Fig. 10 is a vertical cross-sectional view of the synchronizing device shown in Fig. 3. It is used to synchronize the television optical camera, the television transmitter, the local stations and the optical television receivers.

Figure 11:
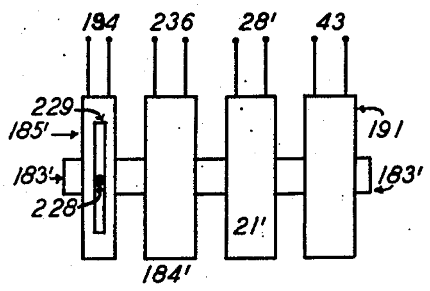

Fig. 11 is a diagrammatic top view of the motor, synchronizer and two generators employed at the television transmitter and at the local stations. It illustrates the generation of the intermittent and continuous scanning signals by electric motor generators. It also shows the synchronization of these devices.

Figure 12:
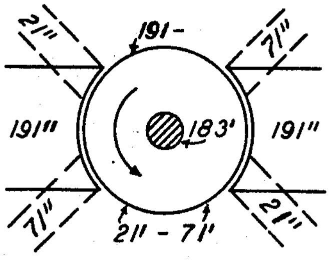

Fig. 12 is a diagrammatic view of the bi-polar fields employed by the two generators to produce the intermittent and continuous scanning impulses. It illustrates the position relation between the bi-polar fields of the continuous scanning signals and the intermittent scanning signals at the television transmitter and at the local stations.

Figure 1:
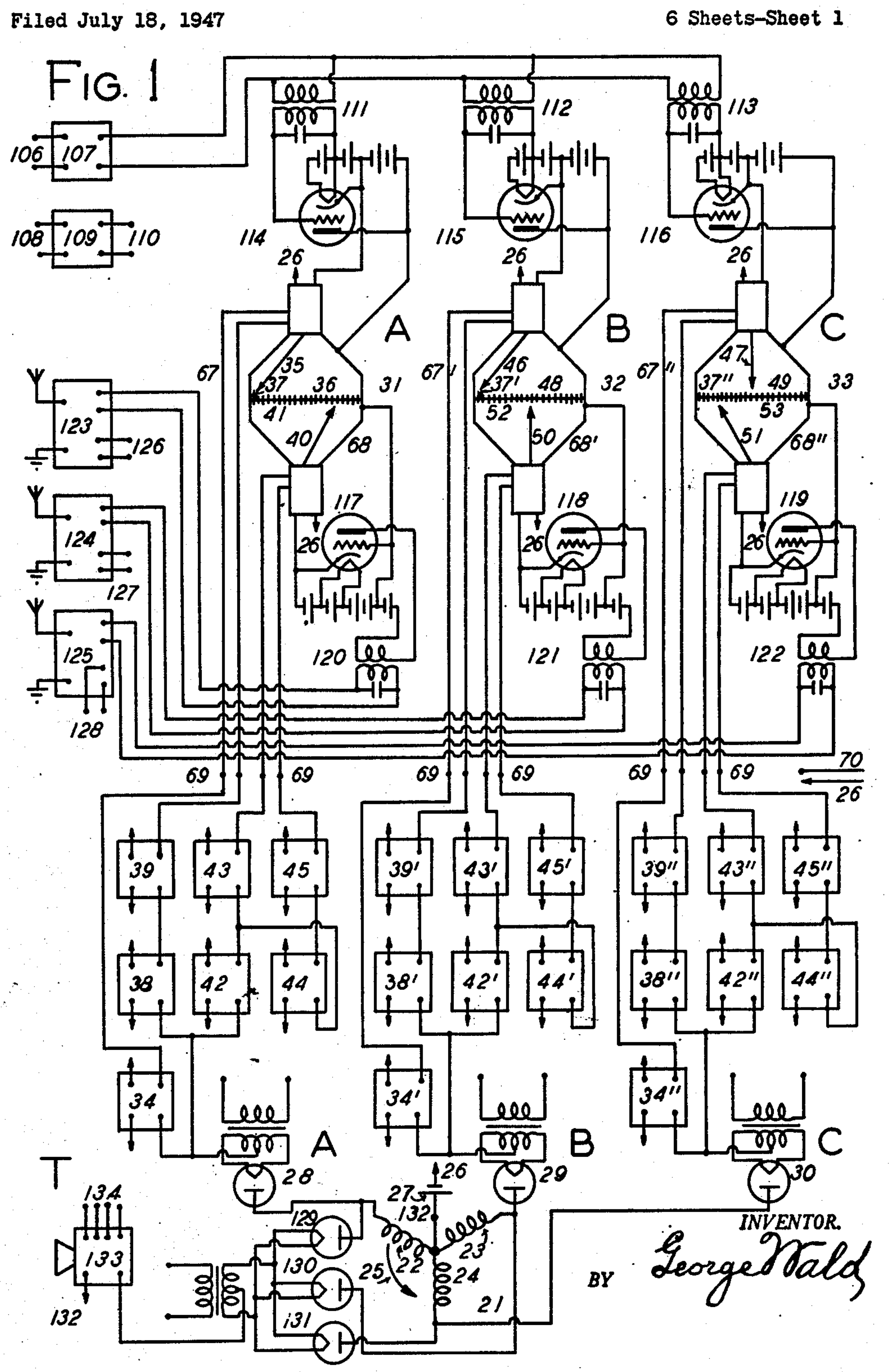
Fig. 1 is a diagrammatic view of the devices and circuits employed at the television transmitter.
Figure 2:
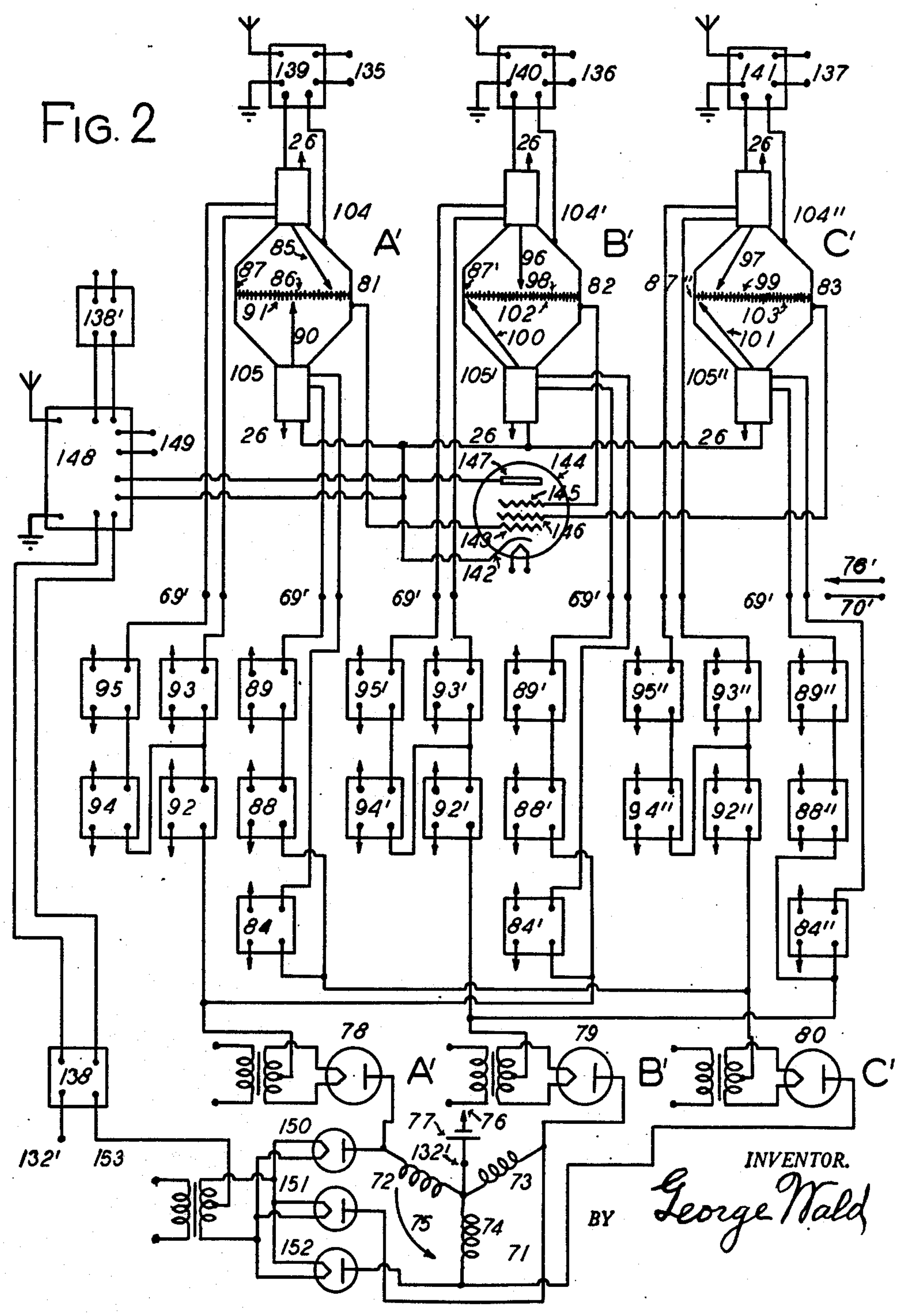
Fig. 2 is a diagrammatic view of the devices and circuits employed at the local station.
Figure 13:
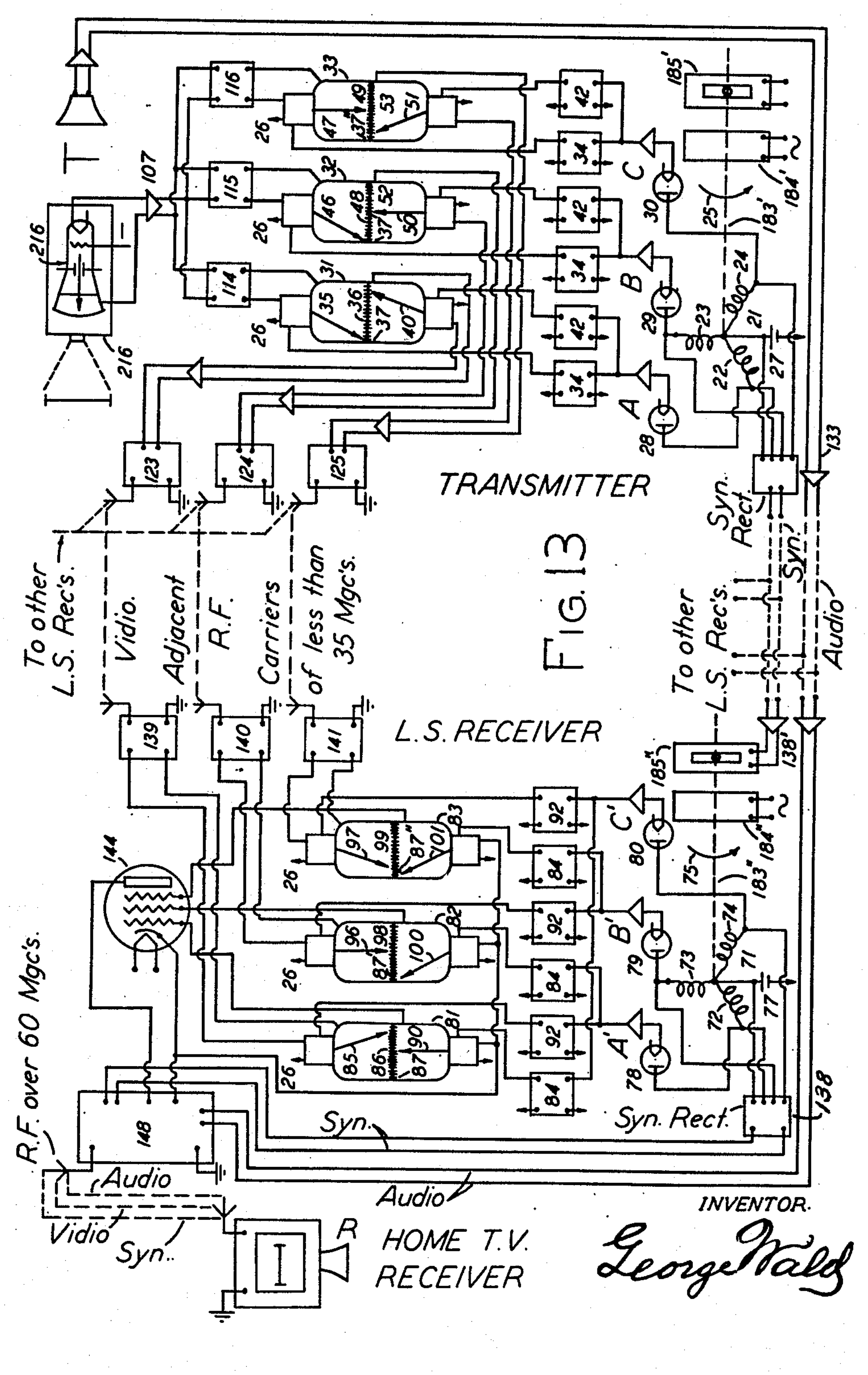

Fig. 13 is a diagrammatic view of the principal devices and circuits shown in Figs. 1, 2, 3, etc. It illustrates the alignment of the transmitter, the local station receiver and the home-television receiver.

Referring to the drawings more particularly by reference to numerals, in order that the theory and operation of the apparatus may be understood, there is disclosed in Fig. 1 and Fig. 13 an alternating current, Y-connected, three-phase generator 21. This generator 21 is revolving at ten revolutions per second, or six-hundred revolutions per minute, and its direction of rotation is as indicated by the arc-arrow 25. The common terminal 26 is connected to the center of the Y-windings 22, 23 and 24. A direct current source of electric power 27 is placed in series with tthe common terminal 26, which keeps its potential negative relative to the potential of the rectifiers 28, 29 and 30. All common leads, indicated by a pointed arrow, are connected together. The half-wave rectifiers 28, 29 and 30 rectify separately, one alternation of the current produced by each winding 22, 23, and 24 respectively. Thus for each revolution of the generator 21 three separate electric current impulses are produced. Each impulse lasting one-thirtieth of a second, each impulse following the other and each impulse is displaced from one another, by a phase difference of 120 degrees, or by one-thirtieth of a second.

The three one-thirtieth of a second electric impulses are used as scanning impulses in the separate three-phase circuits A, B and C. These three phase circuits A, B and C are alike and the operation of each is the same in all respects, except that the scanning impulses of each, lags one-thirtieth of a second behind the one preceding it. In phase A circuit, the one-thirtieth of a second impulse is conducted through circuits indicated at 34, which circuits translate the impulse into a saw-tooth and peaked scanning impulse, as well known in the art. The lead from 34 is connected to one vertical deflecting plate (not shown) of the input side 67 of the storage-tube 31. The opposite deflecting plate (not shown) is connected to the common terminal 26. Hence when 34 produces a vertical scanning impulse the cathode-ray beam 35 scans a vertical sweep across the mosaic 36 (in the drawings from left to right) at a rate of ten intermittent sweeps per second, completing each sweep in one-thirtieth of a second. The maximum potential of the scanning impulse is twice as high as the potential of the direct current power 27, hence the moment the potential of the scanning impulse reaches the value of 27, the cathode-ray beam 35 is in the middle of the scanning sweep across the mosaic 36. When the potential of the scanning impulse reaches a maximum, the cathode-ray beam 35 is at the end of the sweep (right-hand in the drawings). When the one-thirtieth of a second scanning impulse ceases abruptly, the potential of 27 quickly returns the sweep of the cathode-ray beam 35 to a position at 37. The latter beam 35 is held at 37 for a period of two-thirtieths of a second, during that time there is no scanning impulse in the circuit at 34.

The rectifier 28 feeds also an oscillator circuit indicated at 38. This oscillator circuit 38 utilizes the one-thirtieth of a second intermittent electric impulse for its plate power supply. It is designed to oscillate and produce 512 impulses during and when there is an impulse produced by the rectifier 28.

Fig. 8(*b*) illustrates diagrammatically a circuit that may be employed to produce line scanning impulses from the one-thirtieth of a second, intermittent, frame scanning impulses. It shows an oscillator circuit having a heated cathode 58′, a grid 57′ and a plate 59′. The one-thirtieth of a second electric impulse, as produced by the rectifier 28 and common 26, is transformed into a box type electric impulse, as well known in the art. This box type impulse is applied to the terminals 56′ and 26 and provides the positive potential for the plate 59′. The plate coil 54′ is tuned by the condenser 54″ to oscillate at 512 impulses per one-thirtieth of a second. The driving coil 55′ is connected to the grid 57′ of the oscillator circuit. Hence when 28 rectifies on one-thirtieth of a second electric impulse, the plate 59′ is supplied with power, and the oscillator circuit oscillates. When the rectifier 28 does not rectify an electric impulse, the plate 59′ has no potential and does not oscillate. The output of 512 oscillations per one-thirtieth of a second, is removed from the terminals 60′ and 26. The impulses produced at 38 are conducted through the circuits indicated at 39, which circuits translates these impulses into saw-tooth and peaked scanning impulses. These scanning impulses produced by 39 are applied to one horizontal deflecting plate of the input side 67 of the storage-tube 31 while the other horizontal plate (plates not shown) is connected to the common lead 26. Thus when the vertical deflecting plates cause the cathode-ray beam 35 to sweep across the mosaic 36 from left to right, the horizontal deflecting plates cause the said beam 35 to make 512 horizontal sweeps (in the drawings perpendicular to the paper). When there is no impulse produced by the rectifier 28, the cathode-ray beam 35 is held at the position 37, which is the upper left corner of the mosaic 36.

The rectifier 28 also feeds the circuits indicated at 42 and diagrammatically shown in Fig. 8(*a*). The leads from the rectifier 28 and common terminal 26, connect to the terminals 56 and 26 respectively. The grid 57 and the cathode 58 are tuned by the coil and condenser 55, to the one-thirtieth of a second impulses. The cathode 58 and the plate 59 are tuned by the transformer and condenser 54 to one-tenth of a second impulses. When a one-thirtieth of a second impulse starts between the cathode 58 and the grid 57 an impulse starts, at the same moment, between the cathode 58 and the plate 59, but due to the fact that this latter circuit is tuned to one-tenth of a second impulse, the current is so to speak, lagging and stretched out, to produce a one-tenth of a second impulse across the terminals 60 and 26. Thus the impulses at 42 start at the same moment the impulses start at 34. The one-tenth of a second continuous impulses are conducted through the circuits indicated at 43, which circuits translates them into sawtooth and peaked scanning impulses. The scanning impulses produced by 43 are applied to one vertical plate of the output side 68 of the storage-tube 31, while the opposite deflecting plate (plates not shown) is connected to the common lead 26. The one-tenth of a second continuous scanning impulses may be produced by some other well known oscillating circuits properly synchronized to start the impulse at the same moment the one-thirtieth of a second impulse starts. For example, the one-thirtieth of a second impulse may be used as a trigger pulse, applied across the input R—C of a sawtooth generator circuit. The time-constant of the output R—C of the latter circuit may be adjusted to produce a one-tenth (or a one-thirtieth) of a second sawtooth scanning impulse. The one-tenth of a second impulse may be generated by a generator as hereinafter explained. The circuits indicated at 44 produce 512 impulses per one-tenth of a second. The circuits indicated at 44 are similar to the oscillating circuit shown in Fig. 8(b). In this case, the impulse supplying the voltage for the plate 59′ lasts one-tenth of a second. The impulses produced by 44 are conducted through the circuits indicated at 45, which translates these impulses into saw-tooth and peaked scanning impulses. These latter scanning impulses are applied to one horizontal deflecting plate of the output side 68 of the storage tube 31, while the opposite deflecting plate (plates not shown) is connected to the common terminal 26. Thus the cathode-ray beam 40 is continuously scanning its mosaic 41 at a rate of ten image-frames per second. The mosaics 36 and 41 are electrically insulated from one another.

The circuits indicated at 34′, 38′, 39′, 42′, 43′, 44′ and 45′, located in phase B scanning circuits, and 34″, 38″, 39″, 42″, 43″, 44″ and 45″, located in phase C scanning circuits, are respectively similar to those indicated at 34, 38, 39, 42, 43, 44 and 45, located in phase A of the scanning circuits. The operation of phases B and C circuits are exactly as above explained in connection with the operation of the circuits in phase A, except that the impulses in each phase differ by 120 degrees, or by one-thirtieth of a second.

A graphic illustration of the instantaneous amplitudes of the various scanning impulses at the storage-tubes 31, 32 and 33, at the transmitter, as well as their corresponding phase relation to one another, in the three phases A, B and C, is shown in Fig. 6a. The curves illustrate three revolutions of the generator 21, for each phase. The upper curves 61, 62 and 63 represent the one-thirtieth of a second scanning impulses as applied to the vertical deflecting plates of the input sides 67, 67′ and 67″ of the storage-tubes 31, 32 and 33 respectively. The lower curves 64, 65 and 66 represent the one-tenth of a second scanning impulses as applied to the vertical plates of the output sides 68, 68′ and 68″ of the storage-tubes 31, 32 and 33 respectively. Considering the scanning impulses in phase A, represented by the curves 61 and 64, we see that they both start at the same moment, each impulse in 61 lasts one-thirtieth of a second, followed by a period of no impulse, for two-thirtieths of a second, while the impulse in 64 lasts one-tenth of a second, and the impulses follow one the other continuously. This holds true for scanning impulses developed and in phases B and C, and shown by curves 62 and 65, and 63 and 66, with the exception that both impulses, the one-thirtieth and the one-tenth of a second, of each phase, lag behind the other phase, by one-thirtieth of a second, or 120 degrees of a revolution of the generator 21.

In this scheme of scanning, the cathode-ray beam 35 scans an image-frame on the mosaic 36 in one-thirtieth of a second, it develops an image-frame, by electronic emission, on the mosaic 41, which is in turn removed immediately but slower by the cathode-ray beam 40. The latter beam 40 scans continuously the mosaic 41 and develops a continuous series of frames, each lasting one-tenth of a second. In phase B and C the same scanning takes place but at one-thirtieth of a second out of phase. Thus when cathode-ray beam 40 scanned one-third of a frame on the mosaic 41, 35 completed scanning 36 and returned quickly to position 37. At that moment beams 50 and 46 started scanning mosaics 52 and 48 respectively. When cathode-ray beam 40 scanned two-thirds of a frame on the mosaic 41, beam 35 still rests at point 37, beam 50 completed one-third of a frame on mosaic 52, beam 46 completed the frame on mosaic 48 and returned the sweep to point 37′. At the same moment, beams 51 and 47 started scanning their respective mosaics 53 and 49. Fig. 1 illustrates the moment, the cathode-ray beam 40 has advanced scanning five-sixths of the mosaic 41, beam 35 is still held at 37 (35 will not start another sweep till beam 40 completed the sweep, and returned the quick return sweep to position 37, when beam 40 and 35 will start together another sweep). Beam 50 has at this moment completed scanning one-half of the mosaic 52, while beam 46 is still held at the position 37′. Beam 51 has scanned one-sixth of the mosaic 53 and beam 47 has completed scanning one-half of its mosaic 49.

Referring to Figs. 1, 5, 9, and 13, the cathode-ray tube 116′ within the television camera 116″, scans the image I, and produces a successive series of image-frames. These image-frames are applied through the transformers 111, 112 and 113 to the modulators 114, 115 and 116 respectively, and in turn they are applied between the cathode and anode (cathodes and anodes not shown) of each input side 67, 67′ and 67″ of each storage-tube 31, 32 and 33 respectively. The television camera is synchronized, by the transmitter synchronizing signals, so that when the cathode-ray beams 35, 46 and 47 sweep in succession their respective mosaics 36, 48 and 49, they scan one at a time one complete one-thirtieth of a second-image-frame on each of the latter mosaics. Thus beam 35 scans say, the first image-frame on the mosaic 36, beam 46 the second image-frame on mosaic 48 and beam 47 the third image-frame on mosaic 49, etc. While each of the beams 35, 46 and 47 scan an image-frame on their respective mosaic, one at a time, the two other beams are at each instance, at rest and do not scan their respective mosaics. And so the thirty image-frames per second scanned by the television camera are divided into three series of image-frames each series containing ten image-frames per second.

As each cathode-ray beam 35, 46 and 47 scan an image-frame on their respective input mosaics 36, 48 and 49, an electronic emission image appears on their respective output mosaics 41, 52 and 53. The output cathode-ray beams 40, 50 and 51 remove the electronic emission image from their respective output mosaics 41, 52, 53, thereby producing between each output second anode and cathode (cathode not shown) a series of electrical picture impulses corresponding to separate and continuous series of ten image-frames each. The output of the three storage-tubes 31, 32 and 33, produce three such series of electrical impulses. The three series of electrical impulses are separately and respectively amplified by the amplifiers 117, 118 and 119, and in turn they are applied to the television transmitters indicated at 123, 124 and 125, through the transformers 120, 121 and 122 respectively. At the latter transmitters, each series of electrical impulses modulate, separately and simultaneously, one-side-band of each of the three adjacent radio-carriers. Thus each transmitter transmits, separately and simultaneously, a series of ten continuous image-frames per second, each series carries but one-third of the total image intelligence and is transmittable over a carrier of less than thirty-five megacycles.

Referring to Figs. 1, 11 and 13, the generator 21 also supplies three-phase current impulses to the single rectifiers 129, 130 and 131. The common terminal for the synchronizing circuit from the generator 21 is at point 132. The rectifiers 129, 130 and 131, together with the common terminal 132, supply thirty electrical impulses per second to the circuits indicated at 133. The circuits at 133 translate these electrical impulses to short pointed synchronizing signals, as is well known in the art. The sound produced at the microphone T produces audio signals. The audio signals so generated may also be amplified at 133 and together with the synchronizing signals taken from terminals 134, are transmitted by a wire chain system to all local stations on the chain system. The synchronizer 185' is not used when the station normally operates as a transmitter. It is used only to synchronize the transmitter to the chain system, just prior to the entering the service as a transmitter, as hereinafter explained.

Figs. 2 and 13 show diagrammatically the television receiver, which is used as a local station. All scanning devices, scanning circuits and the storage-tubes, are substantially the same as those used at the transmitter. The scanning circuits for these devices, as employed at the local station, vary somewhat from the circuits used at the transmitter. A three-phase, Y-connected, alternating current generator 71, has a three-phase winding 72, 73 and 74 and a common terminal 76. All the common terminals, indicated by a pointed arrow, are connected together and are held at a negative potential by the direct current power 77, relative to the potential of the half-wave rectifiers 78, 79 and 80. The direction of rotation of the generator 71 is as shown by the arc-arrow 75 and it revolves at 600 revolutions per minute or ten per second. The scanning impulses produced by the generator 71 and the half-wave rectifiers 78, 79 and 80, in the three phases A', B' and C', lag 120 degrees behind each other. The circuits indicated at 84, 84' and 84'' translates the intermittent one-thirtieth of a second, impulses, into peaked and saw-tooth style, frame-scanning impulses. The circuits indicated at 88, 88' and 88'' produce 512 line-scanning impulses, when and during the time the rectifiers 78, 79 and 80 respectively produce an electric impulse. The circuits indicated at 89, 89' and 89'' translate the latter impulses into peaked and saw-tooth style scanning impulses. The circuits indicated at 92, 92' and 92'' produce continuously the one-tenth of a second frame-scanning electrical impulses, and the circuits indicated at 93, 93' and 93'' respectively translate the latter impulses into peaked and saw-tooth style scanning impulses. The circuits indicated at 94, 94' and 94'' produce 512 line-scanning electrical impulses per one-tenth of a second and the circuits indicated at 95, 95' and 95'' respectively translate the latter impulses into peaked and saw-tooth style line scanning impulses.

At the local station the input sides 104, 104' and 104'' of the storage-tubes 81, 82, and 83 receive one-tenth of a second image-frames, separately and simultaneously. While the output sides 105, 105' and 105'' produce intermittently, one-thirtieth of a second image-frames. The one-tenth of a second frame-scanning impulses produced by 93 and the 512 line scanning impulses produced by 95, are applied to the input side 104 deflecting plates (plates not shown) thereby deflecting the cathode-ray beam 85 and causing it to scan the input mosaic 86 continuously, at a rate of ten image-frames per second. The cathode-ray beams 96 and 97 are likewise scanning their respective mosaics 98 and 99, at a rate of ten image-frames per second. The intermittent, one-thirtieth of a second, scanning impulses, produced by 84, and the 512 line-scanning impulses, per one-thirtieth of a second, produced by 89, are applied to the deflecting plates (plates not shown) of the output-side 105, of the storage-tube 81. Thereby causing the cathode-ray beam 90 to scan intermittently its mosaic 91 and reproduce electrical impulses corresponding to one image-frame, lasting one-thirtieth of a second, like action taking place in the storage tubes 82 and 83.

Since the beam 85 must place an image on the mosaic 86 before beam 90 can remove it, from its second mosaic 91, and since beam 90 scans three times as fast as beam 85 does (as hereinafter explained) each of the two beams 85 and 90 must complete the scanning of their respective mosaics 86 and 91 and make their quick return sweeps together. This requires the beam 90 to remain at its position at 87, until beam 85 has completed scanning two-thirds of an image-frame when beam 90 starts its scanning of the mosaic 91. This is true for all the three phases A', B' and C', or the output of each of the three phases must lag 240 degrees behind the input. To accomplish this, the output scanning impulses in circuits 84 and 88, in phase A', receive the one-thirtieth of a second impulse from the rectifier 80 in phase C', or the output 105 retrieves the one-thirtieth of a second image-frame, electrical impulses, 240 degrees, or two-thirtieths of a second, behind the input side 104 of the storage-tube 81. The output circuits at 84' and 88' in phase B', receive the one-thirtieth of a second scanning impulses, occurring later, from 78 in phase A' and 84''—88'', in phase C', receive the impulse, occurring later, from 79 in phase B'. Bearing in mind that when 79 produces an impulse, from which the one-tenth of a second scanning impulse is produced, for the input side 104' of the storage-tube 82, 78 has already completed its impulse, and there will be another impulse two-thirtieths of a second later, or 240 degrees behind 79. The same is true for the output 105'', the scanning impulses produced by 84'' and 89'' is supplied by 79, which is 240 degrees behind 80.

A graphic illustration of the instantaneous amplitudes of the various vertical scanning impulses at the storage-tubes 81, 82 and 83, at the local station, as well as their corresponding phase relation to one another in the three phases A', B' and C', is shown in the Fig. 6b. The curves illustrate three revolutions of the generator 71 for each phase (actually three and two-thirds revolutions, overlapping one another). The upper curves 61', 62' and 63' of each phase A', B' and C', represent the one-tenth of a second vertical scanning impulses as continuously applied to the deflecting plates of the input sides 104, 104' and 104'' of the storage-tubes 81, 82 and 83 respectively. The lower curves 64', 65' and 66' represent the intermittent one-thirtieth of a second vertical scanning impulses as applied to the deflecting plates of the output sides 105, 105' and 105'' of the said storage-tubes respectively. The scanning impulses in phase A', represented by curves 61' and 64', complete the scanning of the image-frame at the same moment. The same is true for curves 62' and 65', phase B' and for curves 63' and 66', phase C'. The pair of curves of each phase A', B' and C' are 120 degrees, or one-thirtieth of a second, behind the preceding one.

As hereinafter explained, the generator 71 of the local station, is synchronized with the generator 21, Fig. 1, of the transmitter, so they revolve exactly alike. The positions of the input cathode-ray beams 85, 96 and 97 are at the same moment of scanning their respective mosaics, the output cathode-ray beams 40, 50 and 51, Fig. 1, are. The moment shown in Fig. 2, the output cathode-ray beam 90 is one-half completing the scanning of the image-frame, on its mosaic 91, and is developing electrical impulses corresponding to the first image-frame. Cathode-ray beams 100 and 101 are held, by the potential of 77, as applied to their deflecting plates, at positions 87' and 87'' respectively, and are removing no image electrical impulses from their respective mosaics 102 and 103. When 90 completes scanning the first image-frame, and returns to position 87, 100 will scan the second image-frame and develop electrical impulses corresponding to the second image-frame, to be followed by 101 with the third image-frame, etc., in the same proper succession and corresponding to the series of image-frames originally scanned at the television camera.

Each of the three radio receiver 139, 140 and 141 receives separately and simultaneously the television modulated, adjacent radio carriers of less than thirty-five megacycles. Each of the three radio receivers 139, 140 and 141 detects and retrieves one continuous series of electrical picture impulses corresponding to ten image-frames per second. Each series of electrical picture impulses, modulate the anode and cathode (anode and cathode not shown) of each input side 104, 104' and 104'' of each storage-tube 81, 82 and 83 respectively. The image modulated cathode-ray beams 85, 96 and 97 scan continuously and simultaneously their respective mosaics 86, 98 and 99, deflected by their respective continuous scanning impulses, of ten impulses per second and 512 line-impulses per one-tenth of a second. Thereby each input beam places an image on its respective mosaic and develops an electronic image on their corresponding output mosaics 91, 102 and 103. The output cathode-ray beams 90, 100 and 101 respectively remove the electronic image from their corresponding mosaics 91, 102 and 103 and thereby develop corresponding image electrical impulses in the output circuits.

The intermittent television electrical impulses, as developed between the cathode (not shown) and the second anode mosaics 91, 102 and 103, are applied in succession, to the three grids 143, 145 and 146 of the amplifier tube 144 (power supply of 144 is omitted for clarity of the drawings, as it is well known in the art). Thus developing a series of electrical impulses, between the cathode 142 and plate 147, corresponding to the original, say, thirty image-frames per second produced at the television camera. The television impulses from 142 and 147 are applied to the local station's transmitter 148, to be rebroadcasted on any standard television channel assigned to that local station. The television home receiver may be any conventional television type now used to receive video signals and reproduce the images scanned at the transmitter.

Referring to Figs. 2 and 13 the generator 71 also feeds the polyphase current impulses to the half-wave rectifiers 150, 151 and 152 (connected in series), and with the common terminal 132' they produce thirty electrical impulses per second. The outputs of 150, 151 and 152 are supplied to the circuits indicated at 138 by the terminals 153 and 132'. The circuits at 138 change the electrical impulses into short and peaked synchronizing impulses. The circuits at 138 feed the electrical synchronizing impulses to the local station transmitter 148, and they are broadcasted on an adjacent radio-carrier to the video signals radio-carrier. The audio signals received at the local station, by means of the wire chain system, are amplified at 138', they are applied to the local station transmitter 148 and they are broadcasted on the second adjacent radio-carrier to the video signals radio-carrier.

Figs. 11 and 12 show diagrammatically another method to produce the one-thirtieth and the one-tenth of a second scanning impulses, for the storage-tubes at the transmitter and local station. At the transmitter, the shaft 183' revolves at three hundred revolutions per minute, or at five revolutions per second. The shaft 183' has mounted thereon the synchronizer 185', the electric motor 184', the one-thirtieth of a second scanning impulse generator 21' and the one-tenth of a second scanning impulse generator 191. The armature winding of 21' is a double Y-winding. It has six coils, which may be designated as 22, 22'—23, 23'—24 and 24'. The windings 22', 23' and 24' are not shown, in Fig. 1, each of these latter coils may be extended on the armature, diametrically opposite to the coils 22, 23 and 24. Thus the order of the double Y-windings becomes 22, 24', 23, 22', 24 and 23', each lagging behind the other by sixty mechanical degrees, or 120 electrical degrees. The center of the six windings is connected to the common terminal 26. The three collector rings, conventionally used with the Y-winding armature, are split into two sections, differeing in position by sixty degrees. The outer ends of each pair of coils 22—22', 23—23' and 24—24', connect to diametrically opposite set of split rings. As before, a bipolar field is used in the generator 21'. The field poles are narrow and each winding 22, etc. is so laid in the armature slots, as to produce a complete cycle, or two alternations, in one hundred twenty mechanical degrees of rotation of the armature. One brush is used to collect the scanning impulses from each split collector ring, or three brushes for the three split collector rings. The first of the three brushes is connected to the single rectifier 28, the second brush to 29 and the third brush to 30. A whole collector ring and one brush is used for the common terminal 26. Since the shaft 183' is revolving at five revolutions per second, and since six rectified scanning impulses are produced per revolution of the armature, there are thirty scanning impulses produced per second, each impulse lasting one-thirtieth of a second. Each rectifier 28, etc., producing ten intermittent scanning impulses and each impulse is one-thirtieth of a second behind the other. The above description applies equally to the generator 71' replacing 71, Fig. 2, and located at the local station.

The generator 191 has also bipolar field. The field poles 191'' are about three times as wide as the field poles 21'' and 71'' are. 191 has three separate single-phase windings, distributed over a wide arc in the slot of the armature 191'. Each winding is laid in the armature slots, sixty mechanical degrees behind the other winding, so it will produce one complete cycle, or two alternations per each revolution of the armature, in each phase A, B and C, and each alternation lasting one-tenth of a second. Both alternations are rectified by a double-rectifier in each phase. Thus producing ten impulses per second each impulse lasting one-tenth of a second and each impulse lagging by one-thirtieth of a second behind each other.

Fig. 12 shows the relative position of the bipolar field poles, of the generators 191 and 21', also 191 and 71', each superimposed over the other. The armatures of the generators 21', 71' and 191 rotate in a direction shown by the arc-arrow. The bipolar fields 21'' and 21'', at the transmitter generator 21', are placed in the casing in a position so that 21'' coincides with the end point of the field 191'' at the approach of the windings 22, etc., to the fields, while the windings of each phase A, B and C, are similarly placed in the armatures. Hence the one-thirtieth and the one-tenth of a second scanning impulses will start at the same moment. The fields 71'', 71'' and 191'', 191'' of the respective generators 71' and 191 located at the local stations, are placed in their casings in a position to coincide with one another at the point where the windings in each phase leave the field poles. The windings 72', etc., and each winding of the generator 191 are similarly placed in the armatures, so that the one-thirtieth and the one-tenth of a second scanning impulse cease at the same moment. The field poles 21'' and 71'' are shown in the drawings at an accentuated angle. This was done to bring out clearly the relative position of these field poles to the field poles 191''. In practice the field poles 21'' and 71'' are in a radial position to their casings. The terminals from the double-rectifiers producing the one-tenth of a second scanning impulses connect directly to the circuits indicated at 43, 43' and 43'' at the transmitter, and to the circuits indicated at 93, 93' and 93'' at the local station.

Figs. 1 and 5 also illustrate the simultaneous interlacing method. The camera tube 216, Fig. 5, has two cathode-ray guns 217 and 217', that produce the two cathode-ray beams 219 and 219'. The scanning of beams 219 and 219' is respectively synchronized with the periodicity of the input side of the storage-tubes 31, 32, 33 and with those in the duplicate circuits hereinafter explained. Beam 219 is made to lag behind a beam 219' by one-half of an image-frame, plus or minus one-half a line. The image is focused upon the mosaic 218 which is continuously scanned by cathode-ray beams 219 and 219', thereby developing simultaneously two separate chains of interlaced electrical picture impulses, one across each of the impedances 214 and 214' respectively. These chains of electrical picture impulses are amplified at 240 and 240' and they are retrieved at the terminals 106 and 108, respectively. The continuity of the terminals 106 and 108, Fig. 5, is shown in Fig. 1. The electrical picture impulses at 106 are amplified at 107 and stored intermittently, by image-frame, on each input mosaic 36, 48 and 49. These intermittent image-frames are converted to polyphase and continuous chains of image-frames, as previously explained. Each chain modulates one side-band of each radio carrier produced at transmitters 123, 124 and 125 respectively. The electrical picture impulses retrieved at 108 are amplified at 109 and they are conducted from the terminals 110 to three double mosaic storage-tubes located in a duplicate set. The duplicate set circuits are illustrated in Fig. 1, from 107 to points 69, 69, etc. The intermittent and continuous polyphase scanning impulses are conducted to the duplicate set of three storage-tubes by the twelve conductor cable 70 and common lead 26. And so the electrical picture impulses, retrieved at 108, are also stored intermittently, by image-frame, in the duplicate circuits, as heretofore explained. The intermittent image-frames are converted into polyphase and continuous chains of image-frames in the duplicate set. Each polyphase and continuous chain of image-frames is conducted to terminals 126, 127 and 128 respectively. Each chain modulates the opposite side-band of each radio carrier produced at the transmitters 123, 124 and 125 respectively. Thus, in the simultaneous interlacing scanning, six double mosaic storage-tubes and three radio carriers are used. Obviously, when the television camera scans images and produces one single chain of sixty successive interlaced image-frames, each two successive interlaced image-frames form one whole image-frame and they may be processed and deprocessed by the circuits shown in Fig. 13, or six double mosaic storage-tubes may be employed in one single polyphase series and six radio carriers may be used. Fig. 9, in conjunction with Fig. 1, and Fig. 13 illustrate this system.

Fig. 2 further illustrates the simultaneous interlacing method as employed at the local station receiver. In this case each of the receivers 139, 140 and 141 receives a radio frequency carrier of less than thirty-five megacycles per second. Each side-band of each carrier carries the electrical picture impulses corresponding to one interlaced series of ten image-frames per second. The circuits at 139, 140 and 141 divide respectively the two side-bands of each carrier (as hereinafter explained in connection with Fig. 3). Each of the three circuits 139, 140 and 141 respectively demodulates two interlaced series of continuous electrical picture impulses. Thereby, six polyphase series of continuous impulses are retrieved, each series corresponding to one interlacing of ten image-frames per second. Three of those polyphase interlaced series of electrical picture impulses, originally processed at the circuits shown in Fig. 1, may be deprocessed by the storage tubes 81, 82 and 83 respectively. Each interlaced series of continuous image-frames may thus be converted into intermittent series of image-frames, as heretofore explained. The three intermittent series of image-frames may be combined by the combining tube 144, into one series of continuous electrical picture impulses, corresponding to thirty interlacing image-frames per second. The latter single series of continuous electrical picture impulses may modulate one side-band of the radio frequency carrier of the local station transmitter 148. The other three of these polyphase series of electrical picture impulses, originally processed in the duplicate circuits at the transmitter, are applied to the terminals 135, 136 and 137 respectively, and are likewise deprocessed at the duplicate circuits at the local station receiver. (The duplicate circuits consist of three storage-tubes 81, 82 and 83, with a combining tube 144 connected in a three-phase circuit, as shown in Fig. 2.) The output of the duplicate circuit combining tube 144 is conducted to the terminals 149, of the local station transmitter 148, to be rebroadcasted on the opposite side-band of the local stations radio frequency carrier. Thus, the simultaneous interlacing method of scanning may be continued through the home-television receiver.

Figs. 3 and 4 illustrate diagrammatically a home television receiver employing the simultaneous interlacing method. The receiving antenna 154, Fig. 3, is tuned to one side-band of the radio carrier frequency by one-half of coil 155 and condensers 156 and 158. The antenna 154 is also tuned to the opposite side-band of the radio carrier frequency by the other half of coil 155 and condensers 157 and 159. The radio stage amplifier 160 amplifies the radio signals received on one side-band of the radio carrier. The conventional circuits at 166 consist of a local oscillator stage, a mixing stage, I. F. stages, a video detector and amplifying stages. The tuned radio transformer 162 and condenser 163 conduct the signals from 160 to the mixing stage, etc. at 166 and bring the video signals to the proper amplitude level, and these television signals are applied across the video tuned coil 168' and condenser 172', Fig. 4. The radio amplifier 161, tuning coil 164, condenser 165, and the circuits at 167 deliver the television signals, now at their properly amplified level, to the video tuned coil 169' and condenser 173', Fig. 4. The circuits at 167 are substantially the same as those at 166 and they amplify the video signals received on the opposite side-band of the radio carrier. Since each amplifier, 166 or 167, amplifies but half of the television band, and since the vestigial band is entirely eliminated, the amplitude amplification of the television circuits is greatly improved. Fig. 4 illustrates diagrammatically a television receiver tube embodying two cathode-ray gun units 209 and 209'. The two gun units are secured within the base of the tube 208 at a slightly inclined position relative to one another. The television signals obtained across the tuned condensers 172' and 173' are applied across the cathodes (not shown) at 209 and 209' and the grids 211 and 211' respectively. Thus, cathode-ray beams 210 and 210' become television modulated as they scan their common mosaic 212 at a phase difference of one-half an image-frame, plus or minus one-half a line, and produce a simultaneous interlaced image upon the mosaic 212. The power supply 213 supplies power to both cathode-ray gun units. The impedances 214, 214, and the series condensers 215 and 215' keep the television signals confined to each separate circuit.

Fig. 3 also illustrates how the simultaneous interlacing system may be used in conjunction with the optical scanning system. The latter system is fully described in my U. S. Patent #2,306,656, "Optical Scanning," issued December 29, 1942, and Patent #2,292,979, "Television Apparatus," issued August 11, 1942. In this application Fig. 3 illustrates two beams of light 174 and 175 which are concentrated by condensing lenses 176 and 177 and pass through the Nicol prisms 170 and 171 respectively. The sources of light 174 and 175 and the Nicol prisms 170 and 171 are encased within the enclosure 181. The latter enclosure 181 has two partitions 180 and 180', so that each source of light and each Nicol prism is encased separately. Each wall 180 and 181 has a small aperture aligned with each Nicol prism, so that each beam of light 178 and 190 must pass through the aperture into the Nicol prism and through another aperture after leaving it. The beams 178 and 179 are projected upon the revolving mirror disc 182 and reflected in positions 189 and 190 respectively. The revolving mirror disc 182, Fig. 7, has three inclined mirrors 186, 187 and 188 on one surface. The mirrors are inclined so that when the disc 182 revolves, it causes reflecting beams 189 and 190 to scan a light diagonal on the surface of the reflecting mirrors 234 and 235 respectively. The position of the mirrors 234 and 235 cause the reflected scanning light beams 189' and 190' to pass through the prismo-convex lens 230 which focuses them upon the first prismo-concave mirror lens 232. The beams 189' and 190' are refracted and reflected from one prismo-concave lens 232 to another prismo-concave mirror lens 232, etc., and appear as a scanned lighted square on the viewing lens 233, as explained in my aforesaid U. S. patents.

In this case, the amplified television impulses are applied across coils 168 and 169, Fig. 3. Each of these coils act upon one Nicol prism so that the prism bends the light beam passing through it. Hence, the beams of light from the light sources 174 and 175 passing through the Nicol prisms 170 and 171 are regulated by the action of the strength of the television signals applied across coils 168 and 169 so that all, a part, or none of the light in each beam passes through the apertures in 181. Thus, the beams of light 178 and 179 become television modulated and the light square appearing on the lens 233 becomes an image.

Fig. 3 also shows the shaft 183 on which the electric motor 184 is mounted. The motor 184 may be designed to revolve at six hundred revolutions per minute while operating at a terminal voltage of one hundred volts. The terminals 239 may be plugged in a socket of the house electric power circuits. The resistance 237 may be adjusted for the average voltage existing, so that the voltage at the motor terminals 236 will be 100 volts; while a delayed action voltage-regulator, connected at terminals 236, may regulate the variable resistance 238 to compensate for voltage variation due to load changes. The motor 184, therefore, will rotate at a nearly constant speed.

The synchronizer 185, a cross-section of which is shown in Fig. 10, has a non-magnetic disc 223 mounted on shaft 183. Three coils 224 are mounted on the disc 223, circularly displaced from one another by 120 degrees. The disc 223 and the three coils 224 constitute the rotor of the synchronizer 185. The starter of this synchronizer consists of a metal ring 225 solidly secured to casing 185, which, in turn, is secured to the base 226 of the synchronizer. The ring 225 has mounted within it three coils 227, similarly displaced from one another by 120 degrees. The shaft 183 and casing 185 is of magnetic material, while the cores of coils 224 and 227 are non-magnetic. The synchronizing signals produced at the local station may be transmitted, received and amplified at 167, Fig. 3. Terminals 194 at 167 connect to terminals 194 at 185, thus, the amplified synchronizing signals received by the wire chain system are applied to coils 224 and 227 in one series circuit. The synchronizing signals produce a momentary magnetic pull in coils 224 and 227 at a rate of thirty impulses per second. The magnetic pulses have a polarity as shown by S–N, Fig. 10. The coils, therefore, produce a weak magnetic synchronizing pull at each 120 degrees of a revolution of the synchronizer rotor, and a synchronizing pulse is produced for each image-frame. The disc 223 is secured on the shaft in such a position that this magnetic pull takes place at the start of each image-frame. Hence, the thirty impulses per second produced at 138, Fig. 2, and transmitted to the home optical receiver, synchronizes the home receiver with the local station automatically. The cathode-ray type receiver may develop the scanning impulses by oscillators and the oscillators may be synchronized by the amplified blanker signals at terminals 194.

The rotor of the generator 21, Fig. 1, and the rotor of the generator 71, Fig. 2, may be similarly mounted on a shaft 183', as illustrated at Fig. 11. Also mounted on the shaft 183' are the electric motor 184' and the synchronizer 185'. The ring 225, Fig. 10, of the synchronizer 185' is not secured rigidly to the casings 185', but may rotate in the casing 185' on ball bearings to form a rocker. The arm 228, moving in the slot 229 of the synchronizer casing 185', as shown in Figs. 10 and 11, may rock the ring 225 with coils 227 through a 120 degree arc. Thus, when a station in Chicago is broadcasting television and a station in New York is to take over the broadcasting, the attendant in New York will synchronize his monitor to Chicago by moving the arm 228. The motor 184' revolving at about six hundred revolutions per minute, is pulled slowly (in a second or so) into the proper framing position by synchronizing coils 224 and 227. The attendant at each local station may always watch the framing of his monitor, which may have one interlacing of the image-frame from the distance transmitter and one interlacing from his own local station. By shifting the arm 228, he will not only frame the monitor of his own local station correctly, but also the home receivers in his locality, since the synchronizing signal, which the local station produces by the generator 71, controls all home receivers in his vicinity.

The Y-winding generators described heretofore were considered to be bi-polar. It is evident that by using two pairs of field poles, and rotating the generators 21, 71 and 191 at three hundred revolutions per minute, six scanning signals will be produced for each revolution of the armature. Six storage-tubes may thus be employed in the processing circuits and six storage-tubes in the duplicate circuit. Thereby dividing the thirty image-frames per second in each interlacing into six chains of processed electrical impulses. Each chain to contain five image-frames per second. Similar results will be obtained by using a double Y-winding in generators 21 and 71 and six coils in the single-phase generator 191. Furthermore, there is no limit to the number of duplicate circuits that may be used, nor to the number of interlacings an image-frame may be divided into. Hence by changing the speed of the generators 21, 71 and 191, by changing the number of pair of poles, by changing the number of windings in the generators, or by changing the number of duplicate circuits and the interlacing of the image, the thirty image-frames per second may be divided into any number of processed chains of impulses. The number of electrical impulses per second, in each processed chain, can thus be reduced to any desired television band width. For example, when the thirty image-frames per second is divded into six processed chains, each processed chain of electrical impulses would have a television-band of 1.25 million impulses per second and is transmittible on a radio-carrier of 12.5 megacycles. Or the fifteen megacycles television band contemplated to be used may be divided into six chains of 1.25 million impulses each, and transmitted over six adjacent radio-carriers on the 20 to 35 megacycles radio-carrier band. When six scanning impulses are used per revolution of the armatures, six coils 224 and six coils 227 may be used in the synchronizers 185 and 185' and six inclined mirrors 186, 187, etc., may be used in the disc 182 at the receiver.

It is evident that the Y-connected generators 21 and 71 may be replaced by transformers or electronic oscillators, and sychronization may be accomplished by electronic means. It should be understood that I contemplate to utilize these latter means. The grid of the intermittent side (transmitter-input side, local-station-output side), of each storage-tube, may be normally held at a negative bias beyond the cut-off. Hence, normally, there is no electronic beam scanning the mosaic in this side of the storage-tube. The intermittent, one-thirtieth of a second, squared, positive impulse, may be applied to the negative control grid, thereby swinging the grid in a positive direction and removing it from the normal negative cut-off potential. Thus, whenever the intermittent, one-thirtieth of a second impulse exists, there is an electronic beam scanning the mosaic, in the intermittent side of each storage-tube and producing the intermittent, one-thirtieth of a second image-frame scanning. At the transmitter, a second image modulating grid may be employed, in addition to the control grid, and the second grid used to modulate the electronic beam by the television impulses, whenever the electronic beam exists. I merely disclosed the generators as one means to produce the scanning impulses with the proper phase relation to one another.

In order to make the drawings clear I omitted some devices, circuits and certain parts of the devices, well known in the art, but not effected by this novel invention. Par example, the heater, cathode, grid and deflecting plates of the storage-tubes are not shown in the drawings. It should be understood that these devices and circuits are included therein as (not shown).

I have thus disclosed means to accomplish the objects of this invention. My invention is not limited to the particular arrangement of the apparatus described, but may be variously modified without departing from the spirit and scope of my invention.

I claim as my invention:

1. A method of televising consisting of scanning images, developing therefrom a series of electrical picture impulses, converting polyphase currents into a plurality of polyphase characteristic intermittent, phase differentiated continuous impulses, dividing the picture impulses at periodic intervals under the influence of the intermittent polyphase impulses, prolonging the operative duration of the divided picture impulses under the influence of the phase differentiated continuous impulses, developing a plurality of continuous series of electrical impulses from the prolonged picture impulses, transmitting and receiving simultaneously the plurality of continuous series of electrical impulses, converting polyphase currents into polyphase characteristic intermittent, phase differentiated continuous impulses, reverting the operative duration of the picture impulses under the influence of the polyphase impulses, producing a plurality of intermittent series of electrical picture impulses, recombining the plurality of intermittent series of electrical picture impulses into a single series of electrical picture impulses and reproducing images therefrom.

2. A television system comprising means to scan an image, means to develop therefrom a series of electrical picture impulses, means to convert polyphase currents into a plurality of polyphase characteristic intermittent, phase differentiated continuous impulses, means to divide the picture impulses at periodic intervals under the influence of the intermittent polyphase impulses, means to prolong the operative duration of the divided picture impulses under the influence of the phase differentiated continuous impulses, means to develop a plurality of continuous series of electrical impulses from the prolonged picture impulses, means to transmit and receive simultaneously the plurality of continuous series of electrical picture impulses, means to convert polyphase currents into polyphase characteristic intermittent, phase differentiated continuous impulses. means to revert the operative duration of the electrical picture impulses under the influence of the polyphase impulses, means to produce a plurality of intermittent series of electrical picture impulses, means to recombine the plurality of intermittent series of electrical picture impulses into a single series of electrical picture impulses and means to reproduce images therefrom.

3. A method of televising consisting of scanning images, developing therefrom a series of electrical picture impulses, converting polyphase currents into a plurality of polyphase characteristic intermittent, phase differentiated continuous impulses, storing intermittently signals embodying portions of the series of electrical picture impulses under the influence of the polyphase intermittent impulses, producing a simultaneous plurality of polyphase characteristic continuous series of electrical picture impulses under the influence of the phase differentiated continuous impulses, transmitting and receiving simultaneously the plurality of polyphase series of electrical picture impulses and reproducing images therefrom.

4. A television system comprising means to scan images, means to develop therefrom a series of electrical picture impulses, means to convert polyphase currents into a plurality of polyphase characteristic intermittent, phase differentiated continuous impulses, means to store intermittently signals embodying portions of the series of electrical picture impulses under the influence of the polyphase intermittent impulses, means to produce a simultaneous plurality of polyphase characteristic continuous series of electrical picture impulses under the influence of the phase differentiated continuous impulses, means to transmit and receive simultaneously the plurality of polyphase series of electrical picture impulses, and reproduce images therefrom.

5. In a television system the method consisting of receiving simultaneously a plurality of polyphase characteristic continuous series of electrical picture impulses, converting polyphase currents into a plurality of polyphase characteristic intermittent, phase differentiated continuous impulses, storing simultaneously each polyphase continuous series of electrical picture impulses under the influence of the phase differentiated continuous impulses, producing a plurality of intermittent series of electrical picture impulses under the influence of the polyphase characteristic intermittent impulses, combining the plurality of the intermittent series of electrical picture impulses into a single series of electrical picture impulses and producing images therefrom.

6. A television system comprising means to receive simultaneously a plurality of polyphase characteristic continuous series of electrical picture impulses, means to convert polyphase currents into a plurality of polyphase characteristic intermittent, phase differentiated continuous impulses, means to store simultaneously each polyphase continuous series of electrical picture impulses under the influence of the phase differentiated continuous impulses, means to produce a plurality of intermittent series of electrical picture impulses under the influence of the polyphase characteristic intermittent impulses, means to combine the plurality of the intermittent series of electrical picture impulses into a single series of electrical picture impulses and means to produce images therefrom.

7. A method of televising consisting of scanning images, developing therefrom a series of electrical picture impulses, storing intermittently in a polyphase characteristic fashion signals incorporating portions of the series of electrical picture impulses, prolonging the operative duration of each electrical picture impulse, producing a simultaneous plurality of polyphase characteristic continuous series of electrical picture impulses, transmitting and receiving simultaneously the latter plurality of polyphase series of electrical picture impulses, and reproducing images therefrom.

8. A television system comprising means to scan images, means to develop therefrom a series of electrical picture impulses, means to store intermittently in a polyphase characteristic fashion signals incorporating portions of the series of electrical picture impulses, means to prolong the operative duration of each electrical picture impulse, means to produce a simultaneous plurality of polyphase characteristic continuous series of electrical picture impulses, means to transmit and receive simultaneously the latter plurality of polyphase series of electrical picture impulses, and means to reproduce images therefrom.

9. In a television system the method consisting of receiving simultaneously a plurality of polyphase characteristic continuous series of electrical picture impulses, storing simultaneously in a polyphase characteristic fashion each corresponding series of electrical picture impulses, reverting the operative duration of each electrical picture impulse to its original duration, producing a plurality of polyphase characteristic intermittent series of electrical picture impulses, combining the intermittent series of electrical picture impulses into a single series of electrical picture impulses and reproducing images therefrom.

10. A television system comprising means to receive simultaneously a plurality of polyphase characteristic continuous series of electrical picture impulses, means to store simultaneously in a polyphase characteristic fashion each corresponding series of electrical picture impulses, means to revert the operative duration of each electrical picture impulse to its original duration, means to produce a plurality of polyphase characteristic intermittent series of electrical picture impulses, means to combine the intermittent series of electrical picture impulses into a single series of electrical picture impulses, and means to produce pictures therefrom.

11. A method of televising consisting of scanning images, developing therefrom a series of interlaced electrical picture impulses thereby producing a chain of successive interlaced image-frames, storing intermittently by image-frames all of the said series of electrical picture impulses, prolonging the operative duration of each intermittent image-frame, developing a plurality of chains of continuous image-frames from the prolonged intermittent image-frames, thereby producing a plurality of continuous series of electrical picture impulses each series incorporating a number of continuous image-frames, transmitting and receiving simultaneously the plurality of the latter said continuous series of electrical picture impulses and producing images therefrom.

12. A television system comprising means to scan images, means to develop therefrom a series of interlaced electrical picture impulses, thereby produce a chain of successive interlaced image-frames, means to store intermittently by image-frames all of the said series of electrical picture impulses, means to prolong the operative duration of each intermittent image-frame, means to develop a plurality of chains of continuous image-frames from the prolonged intermittent image-frames, thereby produce a plurality of continuous series of electrical picture impulses each series incorporating a number of continuous image-frames, means to transmit and receive simultaneously the plurality of the latter said continuous series of electrical picture impulses and means to produce images therefrom.

13. In a television system the method consisting of receiving simultaneously a plurality of continuous series of electrical picture impulses each series incorporating a number of continuous image-frames, storing simultaneously by image-frame each corresponding series of continuous electrical picture impulses, reverting the operative duration of each image-frame to its original duration, producing a plurality of series of electrical picture impulses each series incorporating a number of intermittent image-frames, combining the intermittent image-frames thereby forming one series of electrical picture impulses, and reproducing images therefrom.

14. A television system comprising means to receive simultaneously a plurality of continuous series of electrical picture impulses each series incorporating a number of continuous image-frames, means to store simultaneously by image-frame each corresponding series of continuous electrical picture impulses, means to revert the operative duration of each image-frame to its original duration, means to produce a plurality of series of electrical picture impulses each series incorporating a number of intermittent image-frames, means to combine the intermittent image-frames to form one series of electrical picture impulses, and means to reproduce images therefrom.

15. In a television system, in accordance with claim 2, means to synchronize the conversion of the plurality of polyphase current impulses into intermittent and continuous polyphase impulses, thereby synchronize the reproduction of images at the receiver with those scanned at the transmitter.

16. In a television system, in accordance with claim 2, means to reduce the recombined series of electrical impulses at the local station receiver into video signals and means to re-broadcast the latter signals over a different radio-frequency carrier.

17. In a television system, in accordance with claim 2, means to reduce the recombined series of electrical impulses into video signals, means to transmit and receive audio and synchronizing signals separately, means to synchronize by the said synchronizing signals the operation of the local station receiver with that of the transmitter, means to retransmit and receive the video, audio and locally produced synchronizing signals over adjacent radio-frequency carriers and means to reproduce therefrom synchronized images and sound.

18. In a television system the method consisting of scanning intergraded images in line areas, producing therefrom a series of successive picture signals, storing intermittently all of the said picture signals, prolonging the operative duration of each picture signal, retrieving simultaneously therefrom by electronic emission a plurality of series of prolonged picture signals each series corresponding to different line areas of each image, developing from the latter signals a simultaneous plurality of continuous series of picture signals, transmitting and receiving simultaneously the plurality of continuous series of picture signals, storing simultaneously each continuous series of picture signals in different line areas of each image, reverting the operative duration of each picture signal to its original duration, developing by electronic emission intermittent series of picture signals, combining the latter picture signals and reproducing images therefrom.

19. In a television system comprising means to scan intergraded images in line areas, means to produce therefrom a series of successive picture signals, means to store intermittently all of the said picture signals, means to prolong the operative duration of each picture signal, means to retrieve simultaneously therefrom by electronic emission a plurality of series of prolonged picture signals each series corresponding to different line areas of each image, means to develop from the latter signals a simultaneous plurality of continuous series of picture signals, means to transmit and receive simultaneously the plurality of continuous series of picture signals, means to store simultaneously each continuous series of picture signals in different line areas of each image, means to revert the operative duration of each picture signal to its original duration, means to develop by electronic emission intermittent series of picture signals, means to combine the latter picture signals and means to reproduce images therefrom.

20. In a television system the method consisting of scanning intergraded images in line areas, developing therefrom a succession of intergraded series of picture signals, storing intermittently each intergraded series of picture signals, prolonging the operative duration of all the picture signals, retrieving simultaneously therefrom by electronic emission series of prolonged picture signals each series corresponding to different line areas of each image, developing from the latter signals a plurality of continuous intergraded series of picture signals, transmitting and receiving simultaneously the plurality of continuous intergraded series of picture signals, storing simultaneously each continuous intergraded series of picture signals in different line areas of each image, reverting the operative duration of each picture signal to its original duration, developing therefrom by electronic emission intermittent intergraded series of picture signals, recombining the latter picture signals and reproducing intergraded images therefrom.

21. In a television system comprising means to scan intergraded images in line areas, means to develop therefrom a succession of intergraded series of picture signals, means to store intermittently each intergraded series of picture signals, means to prolong the operative duration of all the picture signals, means to retrieve simultaneously therefrom by electronic emission series of prolonged picture signals each series corresponding to different line areas of each image, means to develop from the latter signals a plurality of continuous intergraded series of picture signals, means to transmit and receive simultaneously the plurality of continuous intergraded series of picture signals, means to store simultaneously each continuous intergraded series of picture signals in different line areas of each image, means to revert the operative duration of each picture signal to its original duration, means to develop therefrom by electronic emission intermittent intergraded series of picture signals, means to recombine the latter picture signals and means to reproduce images therefrom.

22. In a television system the method consisting of scanning images in line areas, producing therefrom a series of successive picture signals, storing intermittently all of the said picture signals, prolonging the operative duration of each picture signal, retrieving simultaneously therefrom by electronic emission a plurality of continuous series of picture signals each series corresponding to a different line area of each image, transmitting and receiving simultaneously the plurality of continuous series of picture signals, storing simultaneously each continuous series of picture signals in a different line area of each image, reverting the operative duration of each picture signal to its original duration, developing by electronic emission intermittent series of picture signals, combining the latter picture signals and reproducing images therefrom.

23. In a television system the method consisting of scanning intergraded images in line areas, developing therefrom a succession of intergraded series of picture signals, storing intermittently each intergraded series of picture signals, prolonging the operative duration of all the picture signals, retrieving simultaneously therefrom by electronic emission a plurality of continuous intergraded series of picture signals, transmitting and receiving simultaneously the plurality of continuous intergraded series of picture signals, storing simultaneously each continuous intergraded series of picture signals, reverting the operative duration of each picture signal to its original duration, developing therefrom by electronic emission intermittent intergraded series of picture signals, recombining the latter picture signals and reproducing intergraded images therefrom.

GEORGE WALD.

REFERENCES CITED

The following references are of record in the file of this patent:

UNITED STATES PATENTS

| Number | Name | Date |
|---|---|---|
| 1,632,099 | Schelleng | June 14, 1927 |
| 1,760,159 | Mathes | May 27, 1930 |
| 1,771,360 | Thrum | July 22, 1930 |
| 1,932,253 | Ives | Oct. 24, 1933 |
| 1,945,626 | Baird | Feb. 6, 1934 |
| 2,103,481 | Mathes | Dec. 28, 1937 |
| 2,191,565 | Henroteau | Feb. 27, 1940 |
| 2,219,021 | Riesz | Oct. 22, 1940 |
| 2,277,516 | Henroteau | Mar. 24, 1942 |
| 2,321,611 | Moynihan | June 15, 1943 |
| 2,375,966 | Valensi | May 15, 1945 |
| 2,381,901 | Goldsmith | Aug. 14, 1945 |
| 2,406,266 | Sziklai | Aug. 20, 1946 |
| 2,408,108 | Teal | Sept. 24, 1946 |

FOREIGN PATENTS

| Number | Country | Date |
|---|---|---|
| 386,849 | Great Britain | Jan. 26, 1933 |
| 928,783 | France | June 16, 1947 |